United States Patent Office 3,502,880
Patented Mar. 24, 1970

3,502,880
AUTOMATIC CURVE SCANNING SYSTEM
Miloslav Martinek, Jaroslav Toifl, and Jan Hendrych, Prague, and Karel Pryl, Samechov, Czechoslovakia, assignors to Vyzkumny ustav Matematickych stroju, Prague, Czechoslovakia, a firm
Filed Mar. 1, 1967, Ser. No. 619,849
Int. Cl. G05b 1/01, 11/32, 13/02
U.S. Cl. 250—202
27 Claims

ABSTRACT OF THE DISCLOSURE

A new closed-loop curve scanning system has been developed in which a scanning head having no relatively movable parts generates a pair of distinct non-coincident sequences of digital command pulses in response to opposite deviations of the curve with respect to the axis of the head in at least one selected coordinate. The command sequences respectively position an incremental digital servo-mechanism in a corresponding one of two opposite directions for each coordinate to move the head along the curve. The command sequences may be developed in response to either simultaneous or sequential outputs from the curve-sensing elements in the scanning head.

BACKGROUND OF THE INVENTION

Many applications presently exist in which a prescribed curve or contour is traced for the purpose of developing data descriptive of the contour and/or for duplicating it at a different location. In automatically controlled machining devices, for example, the contour of a prescribed pattern or prototype to be duplicated may be followed by a closed-loop scanning system. The system includes a scanning head which generates command signals as a function of the deviation of the contour from a reference axis. The command signals position a servo-mechanism linked to the scanning head to drive the latter in a direction tending to reduce the deviation. The resultant motion of the head along the curve is transmitted via a separate electromechanical link to a machine tool which generates an identical contour or curve. Analogous applications, such as X–Y coordinate plotting systems, automatic steering of vehicles along prescribed paths, and analysis of biological data generated in curve form, may be treated in a similar manner.

The scanning heads employed in typical scanning systems of this type are generally arranged to determine the orientation of the contour or curve with the aid of relatively moveable mechanical parts, such as swingably mounted mirrors or rotatable prisms which must be fabricated with precision. Even when constructed in such a costly way, such parts are difficult to operate and frequently malfunction. Moreover, the subsequent resolution of the motion of such parts into unique components which may be conveniently handled by the servo-mechanism may be cumbersome.

SUMMARY OF THE INVENTION

The instant invention provides an automatic contour tracing arrangement in which the scanning head has no relatively movable parts. In particular, the scanning head includes a plurality of relatively fixed, substantially identical sensing elements (illustratively photodiodes) disposed around the axis in a regular pattern. The elements are grouped for the sensing the relative deviation in opposite directions for each such coordinate to facilitate the resolution of the correcting motions along the proper directions. Means are further provided for developing, for each coordinate, a pair of control signals (preferably sequences of digital control pulses) for each of the two opposite senses of the deviation of the contour from the axis in the associated coordinate. Each pair of digital sequences may be individually employed to drive a positioning servo of the incremental digital type, which servo is uniquely associated with that coordinate, in a corresponding one of two opposite directions to minimize the deviation in that coordinate.

If the sensing and correction are to be done in two orthogonal coordinates with the aid of an associated pair of servo-mechanisms, provision may additionally be made so that, at any given instant of time, one servo is positioned with the aid of the above-mentioned control signals while the other servo proceeds in one of two selectable opposite directions at a constant velocity. The particular servo that is to be responsive to the control signals at any one time is determined by a deciding circuit in accordance with the instantaneous angles that the traced curve forms with the orthogonal coordinates.

In one illustrative arrangement for generating the required control sequences for each coordinate, selected combinations of outputs of all of the sensing elements are simultaneously generated. Alternatively, the outputs of the individual sensing elements may be successively outpulsed in a selectable recurrent pattern, in which case the pairs of control sequences may be derived from respectively opposite increments between the outputs of successive pairs of sensing elements in the sequence.

BRIEF DESCRIPTION OF THE DRAWING

The nature of the present invention and its various advantages will appear more fully from a consideration of the following detailed description when taken in conjunction with the appended drawing, in which.

Figure 1:
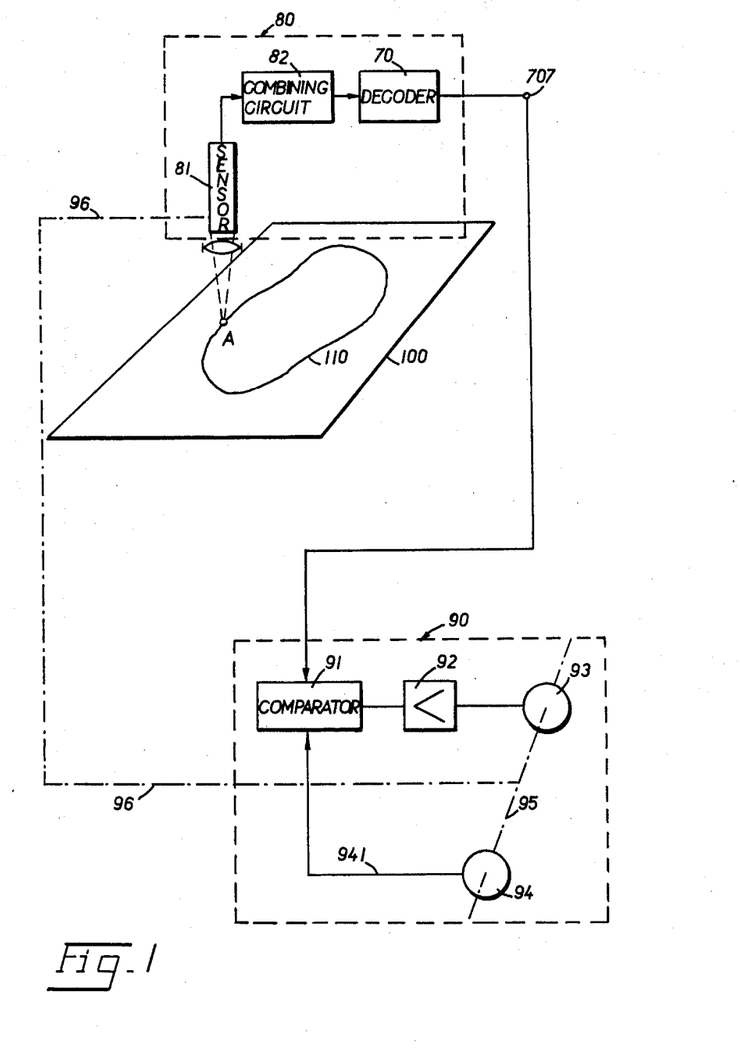
FIG. 1 is a combined block and schematic diagram of an overall closed-loop scanning system in accordance with the invention.

Referring now in more detail to the overall closed-loop tracing system shown schematically in FIG. 1 of the drawing, a scanning head 80 constructed in accordance with the invention is provided for following the contour of a closed planar curve 110 in at least one coordinate. The curve 110 is overlaid on a suitable base surface 100, which is assumed to be illuminated (by means not shown) in the vicinity of the curve 110 such that in the position depicted, a region around point A of the curve projects an opaque shadow toward an otherwise-illuminated arrangement 81 of sensing devices (illustratively individual photodiodes) through an associated objective lens. Illustrative forms of the arrangement 81 will be described below.

The photodiodes in the arrangement 81 are disposed in relatively fixed relation within the scanning head 80, and in particular are assumed to be arranged in a regular pattern around a control reference axis (not shown) of the head. The sensing diodes individually generate output indications in response to the intensity of the shadowed illumination thereof by the surface 100, and therefore to the orientation of the curve 110 with respect to the sensing arrangement 81 these outputs are applied to a suitable combining circuit 82, which in turn generates a non-coincident pair of control signals for each of the coordinates to be scanned by the head 80. In the position shown in FIG. 1, for instance, one of the control signals for each coordinate appears when the curve 110 deviates in one of two opposite directions from the reference axis as measured along that coordinate and the other of the control signals appears when the curve 110 deviates from the axis in the other direction. Neither of the control signals appears when the curve is coincident with the axis.

The control signals for each coordinate are applied to the decoder 70. The latter generates, for each pair of control signals applied thereto, a sequence of digital pulses which serve as command signals for activating a servo-mechanism 90 assigned to position the scanning head 80 in the associated coordinate. (Separate servo-mechanisms are provided for each coordinate.) To this end, the pulse sequences from the decoder 70 are individually applied, via a path 707, to a signal input of a comparator 91. The comparator 91 may take the form, e.g., of an arrangement of unidirectional counters (not shown) whose outputs are suitably combined in the manner shown and described in a copending application Ser. No. 491,204, filed Sept. 29, 1965. The output of the comparator 91 is coupled through a servo-amplifier 92 to a reversible servo-motor 93. The motor 93 positions the scanning head 80 in the associated coordinate through a mechanical link 96 in a direction tending to eliminate the deviation that produced the then-occurring command sequence.

The servo-mechanism 90 is provided with a loop that includes a transducer 94 coupled to the servo-motor 93 by a second mechanical link 95. The transducer 94, which may be a cumulative shaft position encoder, generates indications which are individually indicative of the movement of the servo-motor 93, and thus the scanning head 80, in the two opposite directions of the associated coordinate. The output of the transducer 94 is fed back to a reference input of the comparator 91 via a path 941 in a suitably decoded form that is consistent with that of the command pulse sequences from the path 707.

Figure 2:
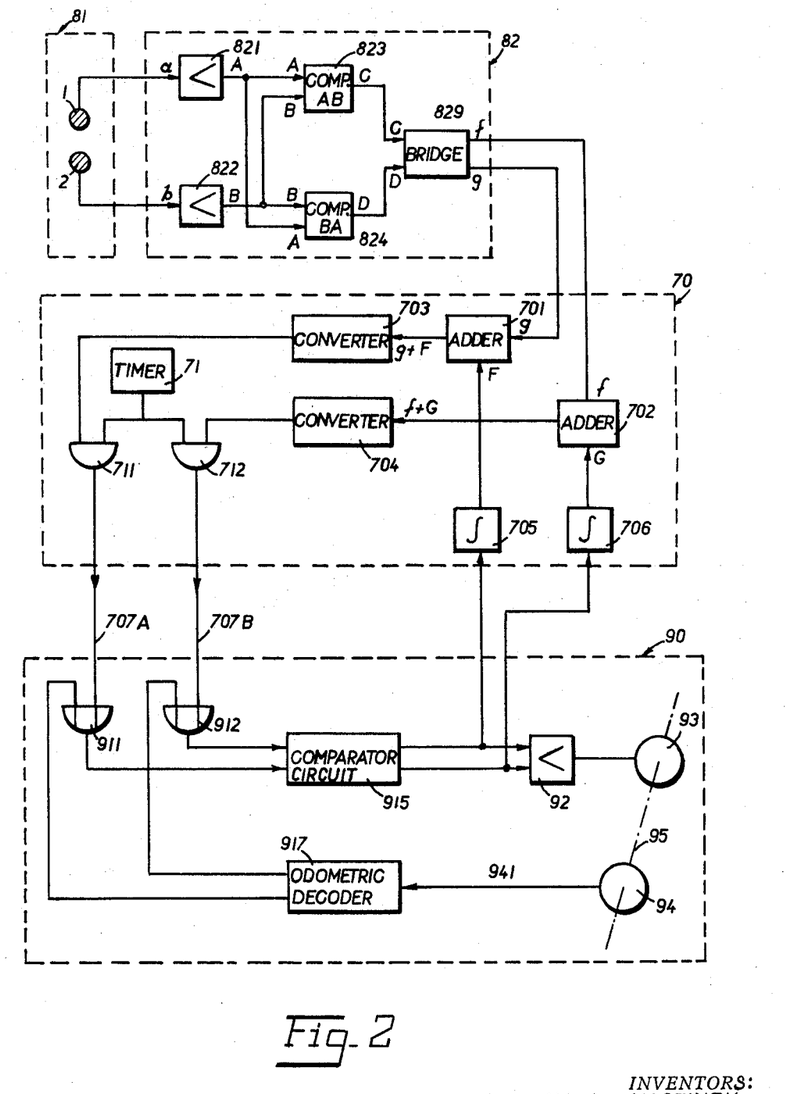
FIG. 2 is a pictorial diagram of one form of the arrangement of FIG. 1 for scanning in one coordinate.

One form of the arrangement of FIG. 1 is shown in more detail in FIG. 2, wherein the scanning head is adapted to be positioned along one coordinate only, e.g., the vertical direction as viewed in the plane of the paper. The arrangement of FIG. 2 may be employed, for example, when the curve or contour (not shown) to be followed varies in one direction only. This may occur, e.g., in the case of the variation of a given parameter with time, where the latter is represented by a unidirectionally moving sheet or chart so that the increments of the latter are always constant. The arrangement 81 includes a pair of photodiodes 1 and 2 co-linearly disposed through the reference axis (not shown) of the scanning head in the vertical direction.

The electrical outputs $a$ and $b$ of the photodiodes 1 and 2 are individually applied to one set of inputs of a pair of comparing networks 823 and 824 in the combining circuit 82 through a pair of amplifiers 821 and 822. The amplifiers serve to increase the levels of the signals $a$ and $b$ to A and B, respectively. The outputs A and B of the amplifiers 821 and 822 are also cross-coupled to a second set of inputs of the networks 823 and 824. The networks 823 and 824 are cooperatively arranged, in a manner well-known in the art, such that the network 823 has an output C equal to $(A-B)$ when A is greater than B, and zero otherwise, and the network 824 has an output D equal to $(B-A)$ when B is greater than A, and zero otherwise. Thus, any non-zero outputs of the networks 823 and 824 are non-coincident. The outputs C and D are respectively applied to the inputs of a conventional bridge 829. The bridge 829 operates linearly on the inputs C and D to yield a pair of outputs $f$ and $g$, wherein $f=Z+KC$, $g=Z+KD$, and Z and K are constants.

The analog output signals $f$ and $g$ from the bridge 829 are individually applied to one set of inputs of a pair of conventional summation circuits 701 and 702, in the decoder 70. A second pair of signals F and G, generated as described below, are individually applied to a second pair of inputs of the summation circuits 701 and 702. The respective sum outputs $(g+F)$ and $(f+G)$ of the circuits 701 and 702 are applied to the inputs of a pair of converters 703 and 704. Each of the converters 703 and 704 is arranged, in a manner well-known in the art, such that the input signal applied thereto is encoded as a binary "one" when the input signal magnitude is above a certain predetermined value, and as a binary "zero" when the input signal is below the predetermined value. In the particular case depicted, a binary "one" results at the output of the circuit 703 when the input $(g+F)$ is greater than the above-mentioned constant Z, and the output of the circuit 704 is similarly encoded as a binary "one" when its input $(f+G)$ is greater than Z. The outputs of the circuits 703 and 704 are individually applied to a first set of inputs of a pair of AND gates 711 and 712. A second set of inputs of the gates 711 and 712 are supplied in parallel by a sequence of pulses at a first predetermined rate from a suitable timing circuit 71. The outputs of the gates 711 and 712 are individually taken from a pair of output leads 707A and 707B of the decoder 70.

The non-coincident sequences of pulses on the output leads 707$a$ and 707$b$ are coupled to a first set of inputs of a pair of OR gates 911 and 912. This first set of inputs effectively forms a pair of signal input branches of comparator 915. A pair of corresponding outputs of an odometric decoder 917, which decodes the cumulative servo-motor shaft position data generated by the transducer 94, are applied to a second set of inputs of the gates 911 and 912. An opposed pair of outputs of the comparator 915, which are derived from the differences of the signal and reference inputs respectively applied to the gates 911 and 912, are routed in parallel to the respective inputs of the amplifier 92 and to the inputs of a pair of conventional integrating circuits 705 and 706 in the decoder 70.

The output of the integrator 705 constitutes the signal F applied to the second input of the summation circuit 701, where it is combined with the co-function $g$ of the signal $f$. In like manner, the output of the integrator 706 is the signal G applied to the second input of the summation circuit 702, where it is combined with the co-function $f$ of the signal $g$.

As in FIG. 1, the motor 93 is excited by the two-state output of the amplifier 92 to impart a suitable movement to the transducer 94 and the scanning head. The output indications from the transducer 94 are coupled to the input of the decoder 917. The latter in turn, provides the pair of outputs as indicated above, which respectively represent the movement of the motor 93 (and thus the scanning head), in opposite directions with respect to the scanning axis.

With the arrangement of FIG. 2, the presence of a pulse sequence on one of the leads 707$a$ and 707$b$ (illustratively the former) indicates that the upper photodiode 1 is being shadowed by the curve 110 (FIG. 1) to a greater extent that the lower photodiode 2, so that the latter receives more illumination. Thus, the servo-mechanism 90 will tend to position the scanning head in the upward direction as viewed in the figure to equalize the illumination of the diodes 1 and 2 (FIG. 2) and thereby tend to center the scanning head axis on the curve 110 (FIG. 1). Similarly, the presence of a pulse sequence on the other one of the output leads 707A and 707B (FIG. 2) is indicative of the fact that the diode 2 is being shadowed more than the diode 1, so that the servo-mechanism 90 will drive the scanning head in the downward direction.

Figure 3:
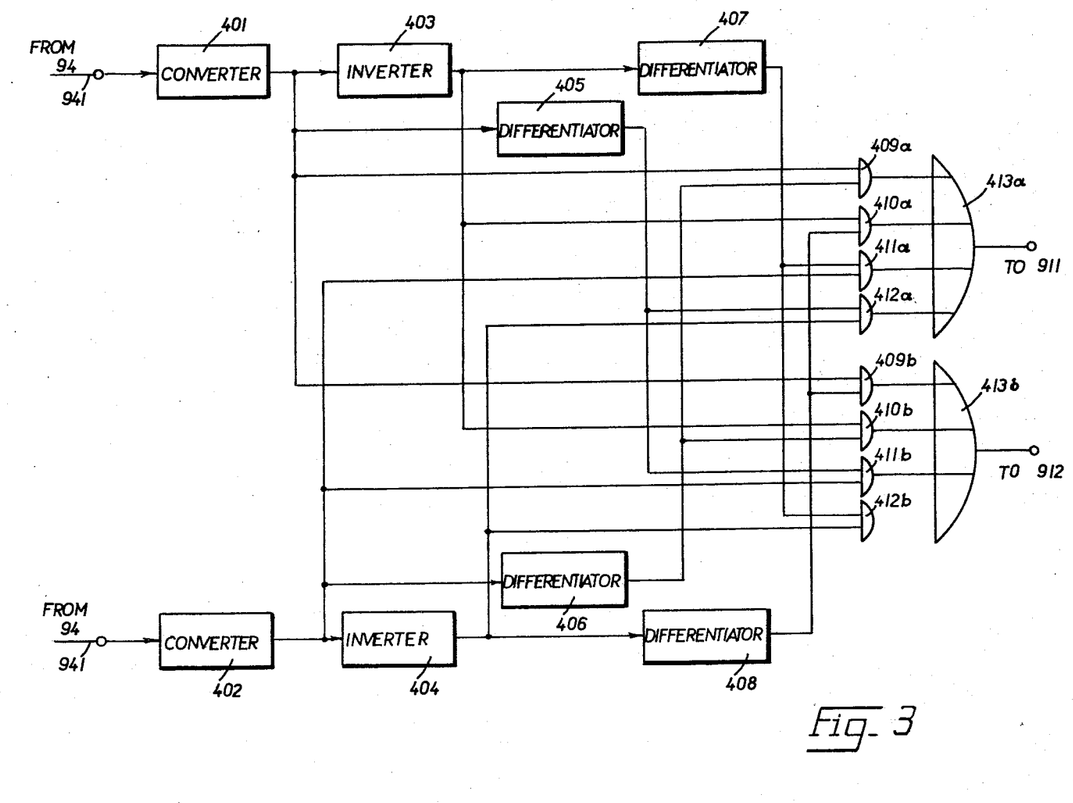
FIG. 3 is a combined block and schematic diagram of a servo-movement decoder suitable for use in the arrangement of FIG. 2.

One illustrative embodiment of the decoder 917 is shown in FIG. 3. The instantaneous outputs from the transducer 94, which will be assumed to have distinct values for rotation of the motor in respectively opposite direction, are applied to a pair of suitable converters 401 and 402. The latter are coupled to the transducer output in a suitable manner via the path 941. The outputs of the converters 401 and 402 are applied to a pair of inverters 403 and 404 and to a pair of first differentiating circuits 405 and 406. The outputs of the inverters 404 and 406 are individually coupled to a pair of second differentiating circuits 407 and 408.

The decoder 917 is also provided with first and second sets 409a–412a and 409b–412b of two-input AND gates. The outputs from the first set are applied to a third OR gate 413a, and the outputs from the second set are applied to fourth OR gate 413b. The reference inputs of the OR gates 911 and 912 (FIG. 2) are respectively coupled to the outputs of the third and fourth gates 413a and 413b of FIG. 3.

The inputs of the gates 409a–412a and 409b–412b are interconnected in a prescribed manner to the outputs of the converters 401 and 402, the inverters 403 and 404, the first differentiating circuits 405 and 406, and the second differentiating circuits 407 and 408. The manner in which such interconnections are made is given in Table I, in which the designations "upper" and "lower" refer to the relative positions of the input terminals of the gates as viewed in FIG. 3.

TABLE I

| Gate and terminal: | Coupled to output of: |
|---|---|
| Gates: | |
| 409a—Upper | Converter 401. |
| 409a—Lower | Differentiator 406. |
| 410a—Upper | Inverter 403. |
| 410a—Lower | Differentiator 408. |
| 411a—Upper | Differentiator 407. |
| 411a—Lower | Converter 402. |
| 412a—Upper | Differentiator 405. |
| 412a—Lower | Inverter 404. |
| 409b—Upper | Converter 401. |
| 409b—Lower | Differentiator 408. |
| 410b—Upper | Inverter 403. |
| 410b—Lower | Differentiator 406. |
| 411b—Upper | Differentiator 405. |
| 411b—Lower | Converter 402. |
| 412b—Upper | Differentiator 407. |
| 412b—Lower | Invertor 404. |

When an odometric decoder of the type shown in FIG. 3 is employed, the output of the transducer 94 is preferably in the form of a pair of unidirectional rectangular pulse sequences each of pulse width $T/2$ and period $T$, but relatively displaced in time by $\pm T/4$. The sense of the displacement is determined by the sense of the corresponding rotation of the servo-motor 93. If the time displaced sequences of pulses from the decoder 94 are respectively applied to the inputs of the converters 401 and 402 (FIG. 3) then for one sense of time displacement the output of the OR gate 413a is a sequence of narrow unidirectional pulses spaced apart by $T/4$ while no output appears on the OR gate 413b, while for the other sense of time displacement the last-mentioned pulse sequence appears at the output of the gate 413b and no output appears on the gate 413a. In all cases, the cumulative movement of the servo-motor 93 in a given direction is proportional to the number of pulses in the sequence at the output of the corresponding one of the OR gates 413a and 413b.

Figure 4:
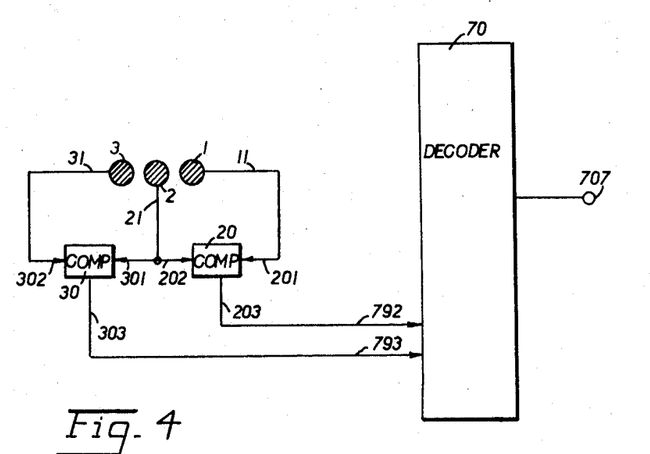
FIG. 4 is a pictorial diagram of a first alternative arrangement of sensing and comparing elements suitable for use in the scheme of FIG. 2.

FIG. 4 illustrates a modified form of the sensing and combining circuits of FIG. 2. The arrangement of FIG. 4, like FIG. 2, is adapted to sense the deviations of a curve from the reference axis of the system in a single coordinate, which is shown for convenience as horizontal in the plane of the paper. The sensing scheme of FIG. 4 differs from the arrangement of FIG. 2 in that a central sensing element 2 is disposed on the reference axis of the system intermediate and in co-linear relation with a pair of peripheral elements 1 and 3. Moreover, a pair of combining networks 20 and 30, which may be similar to the circuit 82 of FIG. 2, are respectively employed to combine the outputs of the peripheral elements 1 and 3 with the central element 2. To this end, the output 31 of the element 3 is applied to one input 302 of the network 30. Similarly, the ouput 11 of the oppositely positioned element 1 is applied to one input 201 of the network 20. The output 21 of the central element 2 is coupled in parallel to a second pair of inputs 301 and 202 of the networks 30 and 20, respectively. The outputs 203 and 303 of the networks 20 and 30 are individually applied to a pair of inputs 792 and 793 of the decoder 70. While, for simplicity, the outputs 203 and 303 are indicated as single leads, it will be understood that by an analogy to FIG. 2 each of these outputs may take the form of a pair of opposed non-coincident signals similar to $f$ and $g$ at the output of the combining circuit 82 of FIG. 2. Thus, the output lead 303 indicates the relative differences in the intensity of illumination of the elements 2 and 3 by the curve to be traced. Similarly, the output 203 indicates the relative differences in the intensity of illumination of the elements 2 and 1. The end result of such a "push-pull" comparison of a common central element with both peripheral elements is greatly to increase the sensitivity of response of the servo-mechanism 90 (FIG. 2) for given deviations of the curve to be traced from the reference axis, and thereby to increase the accuracy of the positioning of the scanning head 81 along the curve. The sensing and combining scheme, depicted in FIG. 4, is known as "extreme regulation" in one coordinate, i.e., the horizontal coordinate as shown in the figure.

Figure 5A:
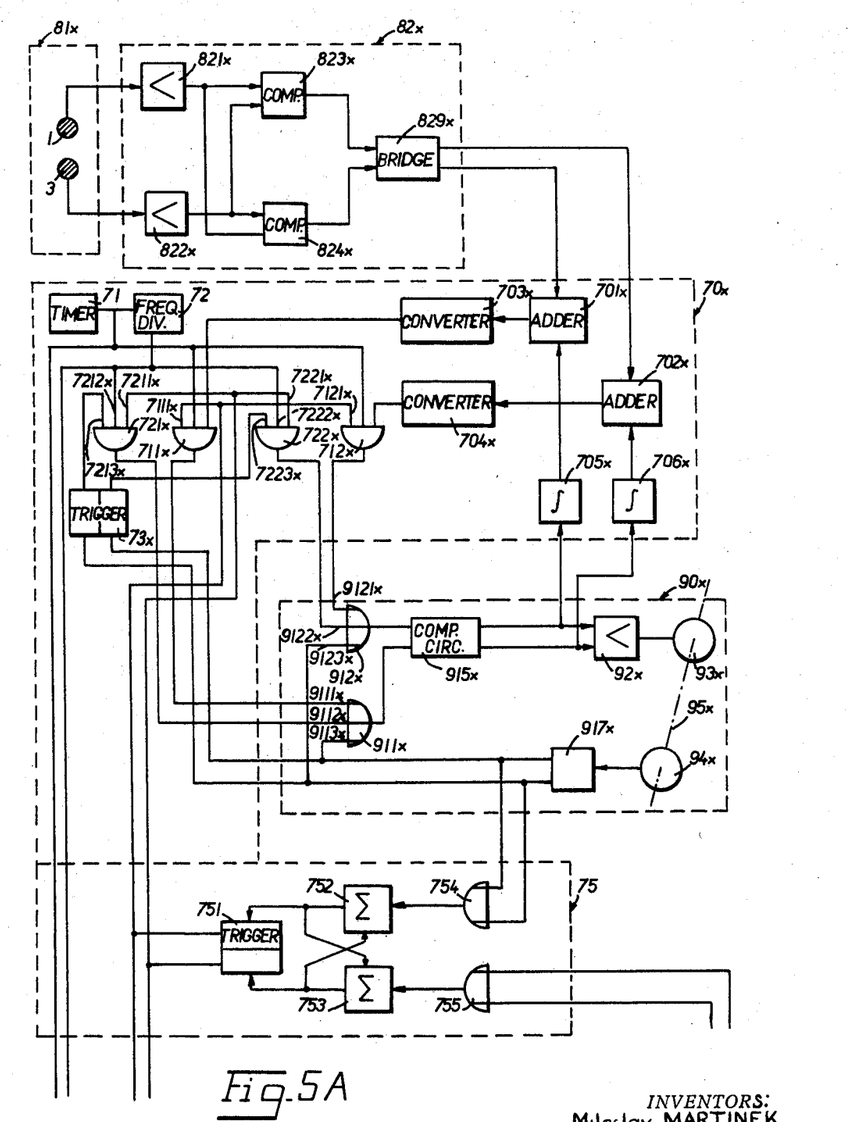
FIGS. 5A and 5B, when taken together, are pictorial diagrams of another form of the arrangement of FIG. 1 for scanning in two orthogonal coordinates.
Figure 5B:
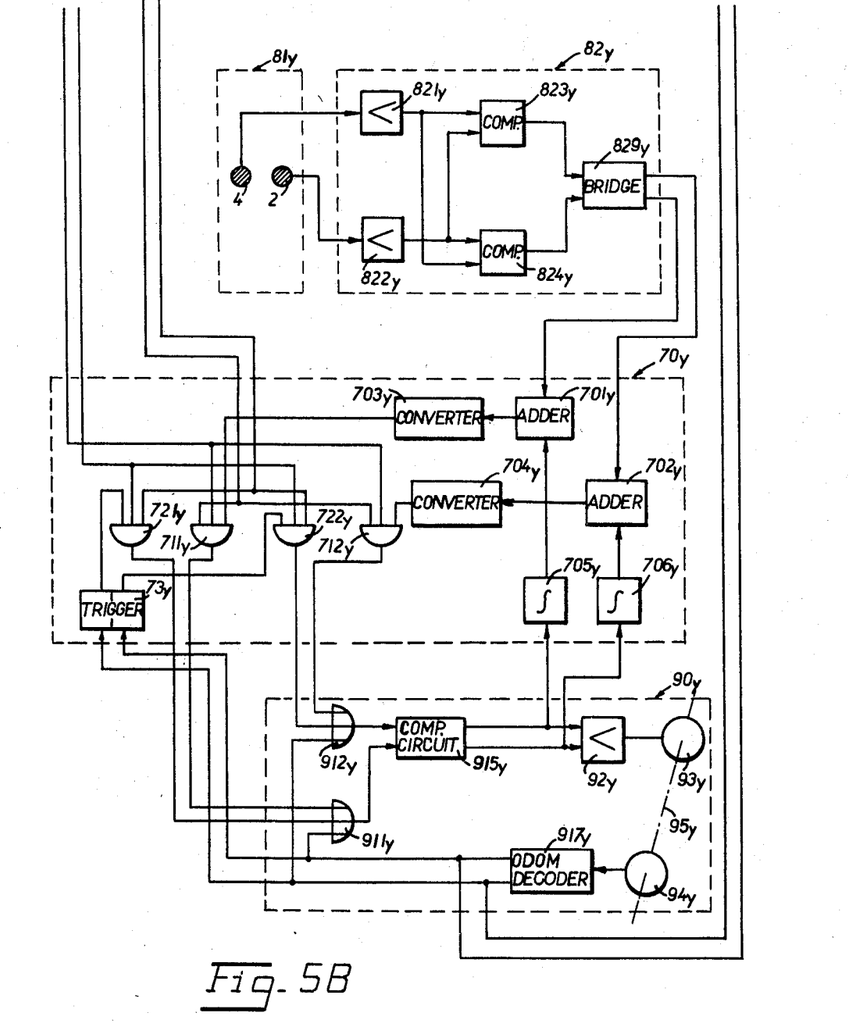

The arrangement of FIG. 2 may be extended to the tracing of a curve whose contour is variable in two orthogonal coordinates, such as the closed curve 110 of FIG. 1. To this end, two perpendicularly disposed sets of sensing element 1, 3 (FIG. 5A) and 2, 4 (FIG. 5B) may be employed. While, for clarity and convenience, each set of elements is shown in FIGS. 5A and 5B in the absence of the other set, it will be understood that in a typical physical embodiment, the respective sets may be disposed (as in FIG. 6) in coplanar relation and in the form of terminations of mutually perpendicular lines of equal length extending through the reference axis. In the scheme shown, these lines would extend in the horizontal and vertical directions as viewed in FIGS. 5A and 5B.

Each set of sensing elements is provided with a separate control signal decoder and servo-mechanism for independently positioning the scanning head in the associated coordinate. Thus, the sensing and positioning subsystem for the vertical X coordinate is, shown in FIG. 5A, while the corresponding subsystem for the horizontal Y coordinate is shown in FIG. 5B. Since, except as indicated below, each of the subsystems of 5A and 5B is identical to the arrangement of FIG. 2, corresponding reference numerals have been used throughout except that the subscripts X and Y have been added to the designations of FIGS. 5A and 5B to identify the portions associated with the respective coordinates.

Before proceeding further with the description of FIGS. 5A and 5B, it may be well to point out certain complexities, exclusive of the necessity of providing duplicate subsystems, which arise when the two-coordinate scanning arrangement of FIGS. 5A and 5B is employed in place of the one-coordinate scanning arrangement of FIG. 2.

Firstly, it will be appreciated by those skilled in the art that incremental digital servo-mechanisms of the type associated with the respective coordinates in FIGS. 5A and 5B should be alternately, and not simultaneously actuated by the command signals generated by the associated scanning head, each servo maintaining an essentially quiescent state between successive actuations. Thus, only one of the two coordinates should be selected for correction by the associated servo-mechanism at any one instant. On the other hand, it is desirable to maintain continuity of motion of the scanning head along the curve during the alternate switching of the servos between their "selected" and "non-selected" states. Preferably, therefore, an arrangement should be provided for initially keeping the servo-mechanism, which is switched into its "non-selected" state, in motion along the curve at a constant velocity.

Moreover, it will be recognized that some internal means must be provided for independently controlling the direction of movement of the servo proceeding in its "non-selected" mode in accordance with externally developed criteria as the correction process in the other coordinate proceeds. This arrangement must also be adapted to determine how long each servo, when selected, must continue to correct the deviation of the curve in one coordinate while the other servo is preceding at a constant rate in the other coordinate. It will be appreciated that the switching from one servo to the other should not in general be done at a constant rate but will have to be done more rapidly as the curvature or contour to be scanned becomes more and more irregular.

Thus, in the context or FIGS. 5A and 5B, at any one instant one of the servos $90x$ and $90y$ will be performing a correcting function in its coordinate under the control of command signals from the scanning head and will be hereafter designated as operating in its "equalization mode." The other servo-mechanism, which at the same instant is preceding independently in the other coordinate a constant velocity, will be assumed to be operating in its "guidance mode."

It will further occur to one skilled in the art that since greater sensitivity is needed to position the scanning head 81 in response to continually varying control signals in the coordinate being selected for correction at that instant, the servo-velocities need not be the same for the equalization and guidance modes. In particular, the velocity of the servo operating in its guidance mode may be significantly reduced relative to that of the servo operating in its equalization mode at the corresponding instant.

With the above considerations in mind, therefore, the arrangement of FIGS. 5A and 5B will now be described. For the sake of simplicity, the corresponding portions of FIGS. 5A and 5B will be described in connection with the vertical, or X coordinate shown in FIG. 5A. It will be understood that such description holds equally well for the scheme of FIG. 5B.

Referring then to FIG. 5A, the decoder $70x$ and $90x$ include, in addition to the components shown in FIG. 2, supplementary logic circuitry which allows the servo $90x$ to be actuated by a relatively rapid sequence of pulses when operating in the equalization mode and a relatively slow sequences of pulses when operating in the guidance mode. Additionally, since the sensing elements 1 and 3 are decoupled from the servo-mechanism $90x$ during the guidance mode, the supplementary logic circuitry is arranged to drive the servo-motor $93x$ in one of two independently selectable directions controlled by the immediately preceding cumulative movement of the motor $93x$ as interpreted by the decoder $917x$. A reversal of direction of the servo $90x$ when acting in its guidance mode, is effected by the decoder 917 when the motion of the servo-motor 93 has driven the decoder $917x$ to a particular unique value in one direction. At this time, the decoder 917 reverses the direction of the servo-motor thereby driving the scanning head at a constant velocity in the opposite direction.

In particular, the outputs of the converters $703x$ and $704x$ in the decoder $70x$ are, by analogy to FIG. 2, indicative of differences of opposite senses in the outputs of the vertical sensing elements 1 and 3, which outputs are respectively applied to a set of first inputs of the AND gates $711x$ and $712x$. The output of the timer 71 is applied to a set of second inputs of the gates 711 and $712x$. Unlike FIG. 2, however, the gates $711x$ and $712x$ are provided additionally with a set of third inhibiting inputs $7111x$ and $7121x$ which are enabled when the servo $90x$ is to be operated in its guidance mode. For this purpose, the third inputs of the gates $711x$ and $712x$ are respectively coupled via a pair of leads $7111x$ and $7121x$, to a first output branch of a deciding circuit 75. The latter is arranged to determine, in the manner described below, which of the servo-motors $90x$ and $90y$ (FIG. 5B) is to operate at any given time in its guidance mode. A second output branch of the deciding circuit 75 is coupled via a first pair of leads $7211x$ and $7221x$, to a first set of inputs of an additional pair of AND gates $721x$ and $722x$ in the decoder $70x$. It will be assumed that the first and second output branches of the deciding circuit 75 are assigned opposite binary states, so that only one of the pairs of AND gates $711x$, $712x$ and $721x$, $722x$ may be enabled by the deciding circuit 75 at any instant. The gates $721x$ and $722x$ are provided with a second set of inputs which are selectively supplied via a second pair of leads $7212x$ and $7222x$ with a sequence of pulses from an adjustable frequency divider 72. The latter, in turn, is coupled to the output of the timer 71 so that the repetition rate of the pulse sequences applied to the gates $721x$ and $722x$ is lower than the pulse sequences applied to the gates $711x$ and $712x$. The gates $721x$ and $722x$ are also provided with a set of third inputs which are selectively coupled, via a pair of leads $7213x$ and $7223x$ to a pair of opposed output branches of a bistable trigger circuit $73x$. The latter has two inputs which are coupled to the decoder $917x$ in the servo-mechanism $90x$ in such a way that the decoder outputs representing opposite senses of movement of the servo-motor $93x$ serve to excite separate ones of the inputs of the trigger circuit $73x$.

As in FIG. 2, the outputs of the gates $711x$ and $712x$ are applied, via a pair of leads $9111x$ and $9121x$ to a first set of inputs of the OR gates $911x$ and $912x$ in the servo $90x$. The oposed outputs of the decoder $917x$, which as indicated above, are applied to the trigger circuit $73x$, are also coupled via a pair of leads $9113x$ and $9123x$ to a second set of inputs of the gates $911x$ and $912x$. The outputs of the gates $721x$ and $722x$ in the decoder $70x$ are individually applied, via a pair of leads $9112x$ and $9122x$, to a third set of inputs of the gates $911x$ and $912x$.

The operation of the portion of the circuitry of FIG. 5A described thus far will now be briefly described. When the subsystem of FIG. 5A is to operate in its "equalization mode" (as in FIG. 2), the deciding circuit 75 enables and AND gates $711x$ and $712x$ which are controlled by the sensing elements 1 and 3 and disables the AND gates $721x$ and $722x$. In the equalization mode, therefore, a sequence of pulses from the timer 71 at the first predetermined rate is applied to the OR gates $911x$ and $912x$ from the enabled gates $711x$ and $721x$.

When the subsystem of FIG. 5A is to be operated in its guidance mode, the outputs of the deciding circuit 75 are switched so that the gates $721x$ and $722x$ may be selectively enabled as described below, and the gates 711x and 712x are each disabled. In this case, a sequence of pulses at a rate lower than the first rate is applied to one of the OR gates 911x and 912x from the corresponding selected one of the gates 721x and 722x. The direction of motion of the servo 90x at a constant velocity in the guidance mode is determined by which of the AND gates 721x and 722x is selected.

The selection between the gates 721x and 722x in the guidance mode is made by the trigger circuit 73x, which applies a binary "one" to one of the gates 721x and 722x and a binary "zero" to the other of them. The output states of the trigger circuit 73x are switched, and the direction of the servo-motor 83x reversed, when the output of the decoder 917x reaches a predetermined state corresponding to the movement of the servo-motor 93x by a prescribed amount in the associated direction. Thus, further motion of the servo-motor 93x in that direction will be prevented.

By analogy of FIG. 5A, a corresponding one of a pair of grouped AND gates 711y, 722y (FIG. 5B) and 721y, 722y in the decoder 70y are coupled to the first and second output branches of the deciding circuit 75 (FIG. 5A). However, the coupling of the deciding circuit 75 to the respective decoders 70x and 70y are of opposite senses. Thus, for example, when a binary "one" is applied to the AND gates 711x and 712x of FIG. 5A from the first output branch of the deciding circuit, a binary "zero" from the second output branch of the deciding circuit 75 is applied to the corresponding gates 711y and 712y of FIG. 5B. Simultaneously, a binary "zero" and a binary "one" are applied to the gates 721x and 722x (respectively 721y and 722y), by the second and first branches, respectively, of the deciding circuit.

When the output states of the deciding circuit 75 are reversed, a binary "one" is applied to the gates 721x, 722x and 711y, 712y, and a binary "zero" is applied to the gates 711x, 712x and 721y, 722y. It follows from the above discussion of FIG. 5A that (1) for each output state of the deciding circuit 75, the subsystems of FIGS. 5A and 5B respectively operate in separate ones of their equilization and guidance modes, and (2) the switching of output states of the deciding circuit 75 correspondingly switches the operating modes of the subsystems of FIGS. 5A and 5B.

The construction of the deciding circuit 75 and the manner in which it switches the servos 90x and 90y between their gudance and equilization modes will now be described. A pair of OR gates 754 and 755 are respectively coupled to the outputs of the decoders 917x and 917y of the servos 90x and 90y. The outputs of the OR gates 754 and 755 are applied to the inputs of a pair of conventional accumulators 752 and 753. The output of each accumulator is applied to a separate input of a second bistable trigger circuit 751, and is also cross-coupled to a resetting input on the other accumulator. In this way, each outpulsing from either of the accumulators resets both of the accumulators to zero. The opposite-state output leads from the trigger circuit 751 constitute the opposite-state first and second branches of the deciding circuit 75.

The switching of a given one of the subsystems of FIGS 5A and 5B from its guidance mode to its equalization mode by the deciding circuit 75 is accomplished when the angle of the traced curve (not shown) with respect to the coordinate of the subsystem then operating in its guidance mode reaches ±45°. This situation occurs when the magnitude of the output indication of the odometric decoder 917 associated with the last-mentioned subsystem becomes greater than the indication of the odometric decoder of the other subsystem. The corresponding accumulator 752 or 753 will then outpulse a signal to the trigger circuit 751 to switch the output states of the latter, thereby switching the operating modes of the subsystems of FIGS. 5A and 5B. It will be appreciated by those skilled in the art that hysteresis in the accumulators 752 and 753 will prevent any uncertainty of switching around the ±45° point, whereby any uncertainty is resolved in favor of maintaining the subsystems in the modes they operated in before the uncertainty arose.

Figure 6:
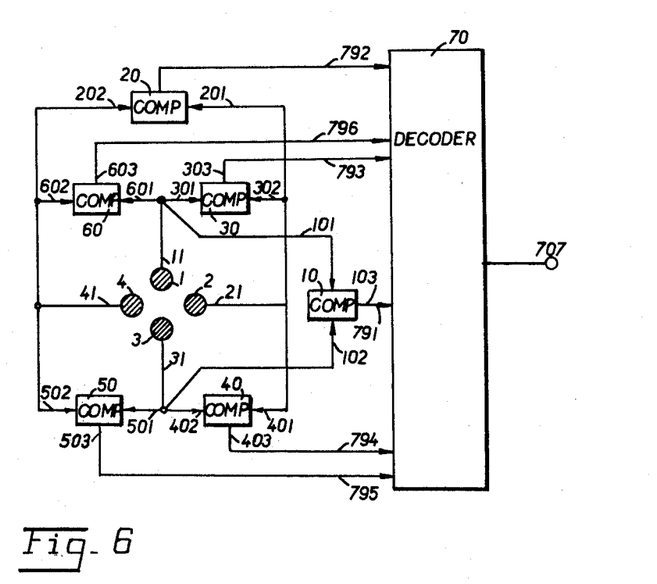
FIGS. 6, 7 and 8 are pictorial diagrams, similar to FIG. 4, of three alternative arrangements of sensing and comparing elements suitable for use with the scheme of FIGS. 5A and 5B.

The arrangement of FIG. 6 is a modification of the combining circuit 82 of FIGS. 5A and 5B for the purpose of generating additional data. The scheme of FIG. 6 differs from the previous one primarily in that the comparison of adjacent pairs of elements, as well as of opposite pairs, is accomplished. The sensing arrangement itself, however, is the same as that of FIGS. 5A and 5B. Thus, in FIG. 6, additional comparisons are made between four adjacent pairs: elements 1 and 2, elements 2 and 3, elements 3 and 4 and elements 4 and 1. This type of arrangement yields, in addition to command signals for the vertical and horizontal directions, data relative to the position of the projected image of the scanned curve with respect to each of the quadrants of the rough square formed by interconnecting adjacent sensing elements, of FIG. 6. The arrangement necessary to instrument the comparison of adjacent elements includes a set of combining circuits 30, 40, 50 and 60. A pair of outputs 11 and 21 of the elements 1 and 2 are applied to a pair of inputs 301 and 302 of the circuit 30. A pair of outputs 21 and 31 of the elements 2 and 3 are applied to a pair of inputs 401 and 402 of the circuit 40. A pair of outputs 31 and 41 of the elements 3 and 4 are applied to a pair of inputs 501 and 502 of the circuit 50, and a pair of outputs 41 and 11 of the elements 4 and 1 are applied to a pair of inputs 602 and 601 of the circuit 60. A plurality of outputs 303, 403, 503 and 603 of the circuits 30, 40, 50 and 60 are applied to a set of adjacent inputs 793, 794, 795 and 706 of the decoder 70. These inputs are then compared in a suitable manner within the decoder 70 such that the largest amplitude signal on the inputs 793–796, for instance, determines the quadrant in which the projection of the curve to be scanned lies. Additionally, as in FIGS. 5A and 5B, a comparison of the elements 1 and 3 for the purpose of generating horizontal command signals is accomplished by coupling the outputs 11 and 31 of the elements 1 and 3 to a pair of inputs 101 and 102 of the circuit 10, which is equivalent to the circuit 82x of FIG. 5A. In like manner a comparison between th elements 2 and 4 for the purpose of generating horizontal command signals is accomplished by coupling the outputs 21 and 41 of the elements 2 and 4 to a pair of inputs 201 and 202 of the circuit 20, which is equivalent to the circuit 82y of FIG. 5B. The outputs of the circuits 10 and 20 are applied to the inputs 791 and 792 of the decoder 70.

It will be understood that the sensing scheme shown in FIGS. 5A, 5B and 6 can be modified by rotating the pattern formed by the sensing elements such that the pairs of elements 1, 4 and 2, 3 are interconnected by respectively parallel horizontal lines, and the pairs of elements 3, 4 and 1, 2 are interconnected by respectively parallel vertical lines. In such a case, the vertical command signals may be generated by comparing the sum of the outputs from elements 1 and 4 with the sum of the outputs from elements 2 and 3, and the horizontal command signals may be generated by comparing the sum of the outputs from elements 1 and 2 with the sum of the outputs from elements 3 and 4.

Figure 7:
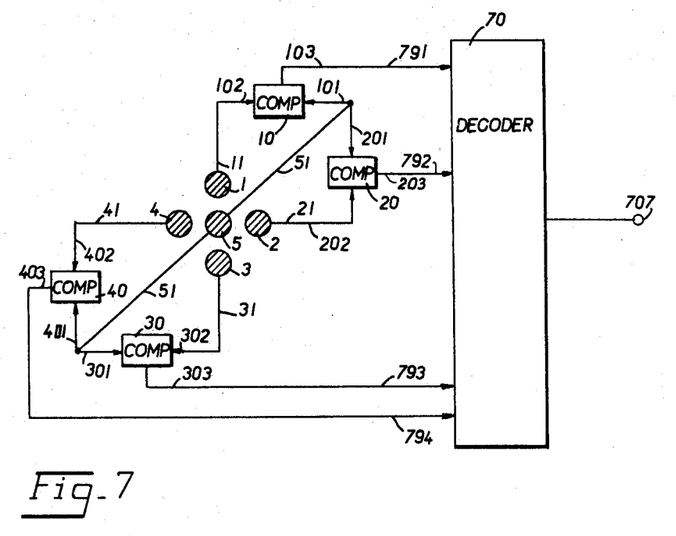

FIG. 7 illustrates a modification of FIG. 6 for providing, by analogy to FIG. 4, "extreme regulation" in two orthogonal axes. This is accomplished by comparing each of the elements in the sensing pattern 1–4 with a centrally located element 5. Thus, the outputs 11 and 51 of the elements 1 and 5 are applied to a pair of inputs 101 and 102 of the circuit 10. The outputs 21 and 51 of the elements 2 and 5 are applied to a pair of inputs 202 and 201 of the circuit 20. The outputs 31 and 51 of the elements 3 and 5 are applied to the inputs 302 and 301 of the circuit 30, and the outputs 51 and 41 of the elements 5 and 4 are applied to the inputs 401 and 402 of the circuit 40. The outputs 103, 203, 303 and 403 of the circuits 10, 20, 30 and 40 are applied to the inputs 791, 792, 793 and 794 of the decoder 70. The "push-pull" inputs 791, 793 for the vertical coordinate and 792, 794 for the horizontal coordinate, may then be individually combined and applied to the associated servo for enhanced sensitivity and correction of deviations of the traced curve in the respective coordinates.

Figure 8:
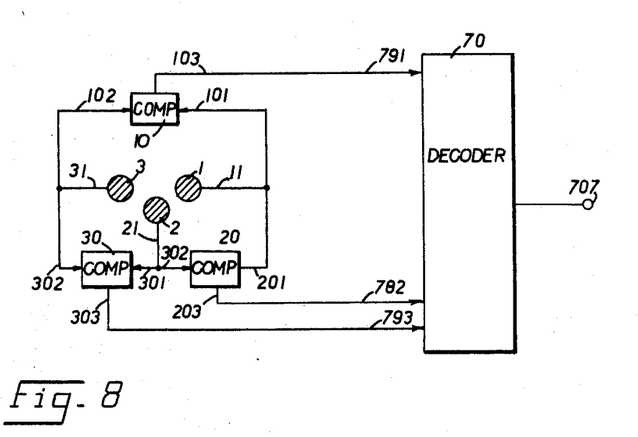

FIG. 8 shows a triangular disposition of a set of three sensing elements 1, 2 and 3. Horizontal sensing is done by comparing the output differences of the elements 1 and 3, and vertical sensing may be done, for example, by suitably combining the output of the element 2 with the outputs of the elements 1 and 3. To accomplish this, the outputs 11 and 21 of the elements 1 and 2 are applied to the inputs 201 and 202 of the circuit 20. The outputs 21 and 31 of the elements 2 and 3 are applied to the inputs 301 and 302 of the circuit 30, and the outputs 31 and 11 of the elements 3 and 1 are applied to the inputs 102 and 101 of the circuit 10. The outputs 103, 203, 303 of the circuits 10, 20 and 30 are applied, as before, to the inputs 791, 792 and 793 of the decoder 70.

Figure 9:
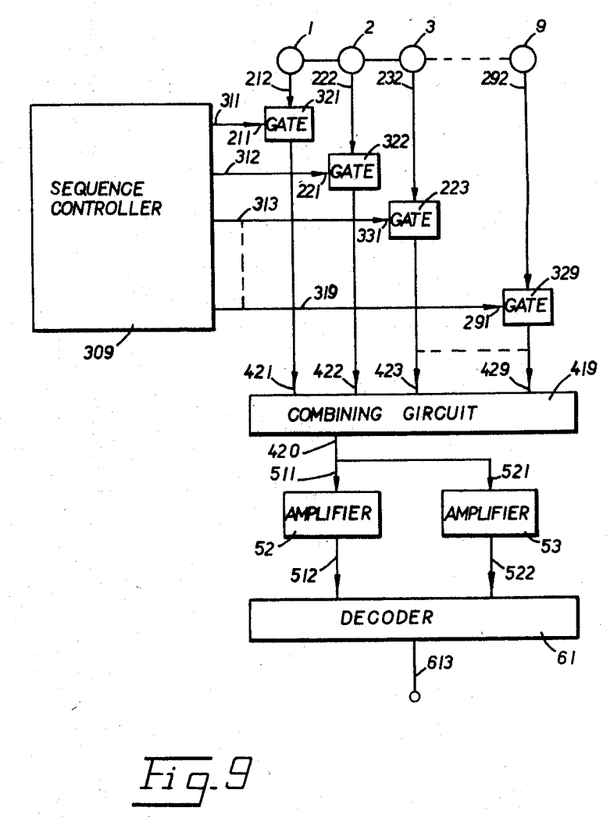
FIG. 9 is a pictorial diagram of a modified sensing and comparing arrangement suitable for use in the schemes of FIGS. 2 and 5A and 5B wherein the outputs of the sensing elements are made sequentially rather than simultaneously available.

In the above description of the embodiments of FIGS. 2–8, it has been assumed that the outputs of the depicted sensing elements have been simultaneously applied to the inputs of the associated combining circuits. It will be appreciated that as the number of sensing elements increases, the arrangement of combining circuits may become quite bulky and complicated, particularly where the combining circuits required for the above applications in the array is contemplated. One manner of simplifying the combining circuits required for the above applications is illustrated in FIG. 9, wherein the numerals 1, 2, . . . 9 are intended to represent any of the above-described or similar configurations of sensing elements and, of course, are not limited to the co-linear configuration depicted. The outputs of the elements 1, 2, . . . 9 are individually applied to a plurality of inputs 212, 222, . . . 292 of a group of normally disabled gating circuits 321, 322, . . . 329. The outputs of the gating circuits are applied to a plurality of inputs 421, 422, . . . 429 of a combining circuit 419 whose output 420 is applied in parallel to a pair of amplifiers 52 and 53 through a pair of inputs 511 and 521. The amplifiers 52 and 53 are arranged in a manner well-known in the art, to be respectively sensitive only to a predetermined one of the two opposite senses of the sum signal at the output 420 of the combining circuit 419.

The signals respectively appearing on the outputs 512 and 522 of the amplifiers 52 and 53 may be generally of the form of the signals $f$ and $g$ at the output of the combining circuit 82 of FIG. 2. The outputs 512 and 522 are coupled to pair of inputs and of a decoder 61, which may be similar to the decoder 70 of FIGS. 2–8. The output of the decoder 61 is shown schematically at 613.

In order to form the required comparisons among the outputs of the elements 1, 2, . . . 9, these outputs are successively gated in a predetermined sequence through the associated gating circuits under the direction of a suitably programmed sequence controller 309. For this purpose, the controller 309 is provided with a set of outputs 311, 312, . . . 319 which are coupled to a plurality of enabling inputs 211, 221, . . . 291 of the gating circuits 321, 322, . . . 329, whereby the latter are enabled in the sequence determined by the controller.

Each pair of successive outputs from the elements are separately combined in the combining circuit 419, and the signs of the increments between the outputs of successive selected pairs of the elements 1, 2, . . . 9 are sensed by a corresponding one of the amplifiers 52 and 53. These increments are coupled, after suitable processing in the decoder 61, to the servo (not shown) of the corresponding coordinate, again under the control of the sequence controller 309. Thus, the scheme of FIG. 9 is similar to those of FIGS. 2–8 except that, since each pair of outputs from the elements 1, 2, . . . 9 is handled at a separate point in time, a single combining circuit (i.e., the combining circuit 419) may take the place of the plurality of combining circuits ordinarily necessary when the outputs of the sensing elements are made simultaneously available. It has been found that operation of the scanning system of the invention in the sequential form shown in FIG. 9 is enhanced if these sensing elements 1, 2, . . . 9 are not mutually independent structure but, instead, form separate portions of a divided or segmented cathode of a photodiode or photomultiplier tube having a common anode. This type of construction is diagrammatically shown in FIG. 10, where the sensing elements 1, 2, . . . 9 comprise a plurality of portions 731, 732, . . . 739 of a divided cathode of such a tube (shown generally at 750).

Figure 10:
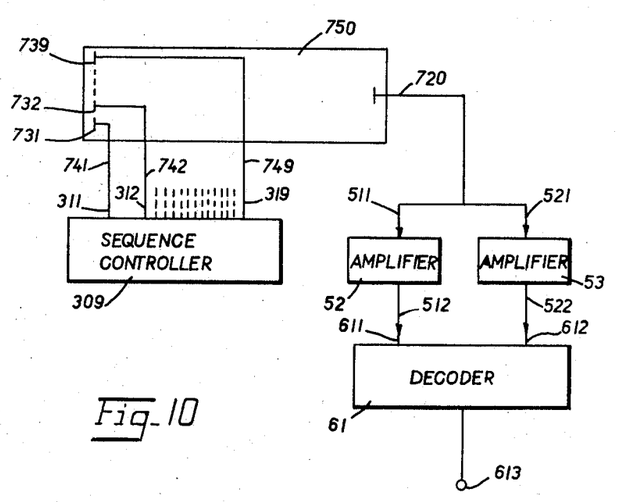
FIG. 10 is a pictorial diagram of one form of the arrangement of FIG. 10.

In this arrangement, the individual portions 731, 732, . . . 739 yield outputs only when excited by an associated one of the outputs 311, 312, . . . 319 of the controller 309 via an associated set of triggering leads 741, 742, . . . 749, so that the gates 321, 322, . . . 329 of FIG. 9 may be dispensed with. Moreover, the function of the combining circuit 419 of FIG. 9 is accomplished, in the scheme of FIG. 10, by the common anode of the tube 750. The remainder of the arrangement of FIG. 10 is substantially identical to that in FIG. 9 except that the output 420 of the combining circuit 419 in FIG. 9 has been replaced by the anode lead 720 in FIG. 10.

Figure 11:
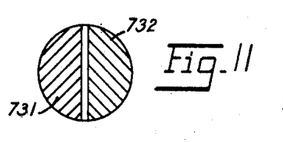
FIGS. 11–15 are pictorial diagrams of sensing elements analogous to those employed in FIGS. 2–8 for use in the arrangements of FIGS. 9–10, wherein the elements are in the form of portions of a segmented cathode in a phototube.
Figure 12:
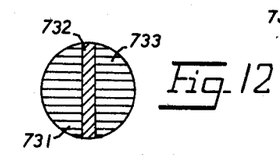
Figure 13:
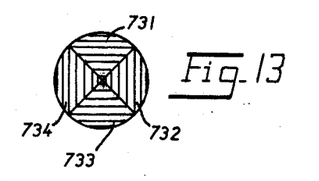
Figure 14:
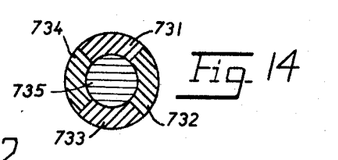
Figure 15:
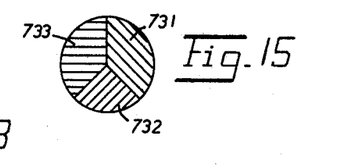

Various suitable physical configurations of the segmented cathode portions 731, 732, . . . 739 are shown in FIGS. 11–15. In FIG. 11, for example, a pair of segments 731 and 732 perform the function of the individual sensing diodes 1 and 2 in FIG. 2. In FIG. 12, an arrangement of three successively disposed segments 731, 732 and 733 perform the function of the one-axis "extreme regulation" sensing elements 1, 3, and 5 shown in FIG. 4. In FIG. 13, a two-axis arrangement of peripheral sensing elements similar to that of FIGS. 5A, 5B and 6 is accomplished by an arrangement of 90° sectors 731, 732, 733 and 734 forming the divided cathode. The two-axis "extreme regulation" sensing scheme of FIG. 7 is accomplished with the arrangement of cathode portions 731–735 of FIG. 14, wherein the portions 731–734 form adjacent peripheral segments and the portion 735 forms the central segment. Finally, the triangular arrangement of cathode portions 731, 732 and 733 in FIG. 15 is analogous to the pattern of the sensing elements 1, 2, and 3 shown in FIG. 8.

In the foregoing, the invention has been described in connection with several preferred arrangements thereof. Since many other variations and modifications will now become obvious to those skilled in the art, it is desired that the breadth of the claims not be limited to the specific disclosure herein contained.

What is claimed is:

1. In a scanning system for tracing a linear curve on a contrasting surface in response to the instantaneous deviation, from the curve, of a movable axis oriented perpendicular to the surface:

a scanning head having a plurality of relatively fixed sensing elements disposed about the axis in a symmetrical pattern for generating substantially equal outputs when the axis is positioned over the curve and for generating outputs individually proportional to the deviation of each element from the curve when the axis is not positioned over the curve, the pattern of elements defining at least one coordinate through the axis;

first means selectively combining the outputs of the sensing elements for generating, for each defined coordinate, a first analog control signal when the axis deviates from the curve in one direction along the coordinate and for generating second analog control signal when the axis deviates from the curve in the opposite direction along the coordinate, the amplitude of each of the first and second control signals being proportional to the magnitude of the associated deviation; and means individually associated with each coordinate and separately responsive to the first and second control signals thereof for moving the scanning head in a corresponding one of two opposite directions along the associated coordinate to minimize the deviation of the axis from the curve.

2. A system as defined in claim 1, further comprising means for simultaneously applying the outputs of all the elements to the first generating means.

3. A system as defined in claim 1, further comprising means for selectively gating the outputs of the sensing elements to the first generating means in a selected recurrent sequence.

4. A system as defined in claim 3, in which the first generating means comprises means for deriving the first and second control signals from increments, in opposite senses between the outputs of successive pairs of elements in the selected sequence.

5. A system according to claim 1, in which the sensing elements comprise photosensitive devices for generating output signals proportional to relative intensities of illumination at their inputs.

6. A system as defined in claim 5, in which the photosensitive devices comprise individual portions of a segmented phototube cathode.

7. A system as defined in claim 5, in which the photosensitive devices comprise individual photodiodes.

8. A system as defined in claim 1 for use with one cordinate, in which the sensing elements form the terminations of a path extending symmetrically through the axis in the direction of the coordinate.

9. A system as defined in claim 8, further comprising a sensing element disposed at the axis.

10. A system as defined in claim 1 for use with orthogonal coordinates, in which the sensing elements are arranged in first and second groups, the first group of elements being spaced along one coordinate and the second group being spaced along the other coordinate.

11. A system as defined in claim 10, in which the elements of the first and second groups form the terminations of mutually perpendicular paths of substantially equal length, each path extending through the axis in the direction of the associated coordinate.

12. A system as defined in claim 11, further comprising a sensing element common to both of the first and second groups and disposed at the axis.

13. A system as defined in claim 10, in which the elements are arranged in the form of the corners of a square surrounding the axis, the opposed pairs of sides of the square extending respectively parallel to the coordinate; and in which the first and second groups overlap in such a manner that the first group terminates one pair of opposed sides and the second group terminates the other pair of opposed sides.

14. A system as defined in claim 13, further including an additional sensing element disposed at the axis.

15. In a scanning system for tracing a linear two-dimensional curve on a contrasting surface in response to the instantaneous deviation, from the curve, of a movable axis oriented perpendicular to the surface:

a scanning head having a plurality of relatively fixed sensing elements disposed about the axis in a symmetrical pattern for generating substantially equal outputs when the axis is positioned over the curve and for generating outputs individually proportional to the deviatioin of each element from the curve when the axis is not positioned over the curve, the pattern of elements defining a pair of orthogonal coordinates through the axis;

first means selectively combining the outputs of the sensing elements for generating, for each of the orthogonal coordinates, a first analog control signal when the axis deviates from the curve in one direction along the coordinate and for generating a second analog control signal when the axis deviates from the curve in the opposite direction along the coordinate, the amplitude of each of the first and second control signals being proportional to the magnitude of the associated deviation; and means individually associated with each of the orthogonal coordinates and separately responsive to the first and second control signals thereof for moving the scanning head in a corresponding one of two opposite directions along the associated coordinate to minimize the deviation of the axis from the curve.

16. In a scanning system for tracing a contour in response to the instantaneous deviation of the contour from a reference axis in at least one coordinate:

a scanning head having at least two relatively fixed sensing elements disposed about the axis in a regular pattern and responsive to the relative position of the contour with respect thereto, the elements being grouped for sensing relative deviations in opposite senses for each coordinate;

first means selectively combining the outputs of the sensing elements for generating first and second control signals individually indicative of opposite senses of deviations in each coordinate;

comparator means including a signal input having at least two main branches, a reference input having at least two corresponding branches and an output having two branches individually associated with the main branches of the signal input;

means for applying the first control signal to one main branch and the second control signal to the other main branch; and a reversible servo-motor coupled to the output of the comparator means for positioning the scanning head along the associated coordinate.

17. A system as defined in claim 16, further comprising second means for generating unique indications representative of the instantaneous movement of the servomotor in respectively opposite directions; and means for individually aplying the unique indications for the opposite directions to the reference input branches of the comparator means.

18. A system as defined in claim 17, in which the first generating means comprises:

first means for deriving, for each coordinate, first and second non-coincident main control signals indicative of respectively opposite senses of differences in the outputs of selected elements associated with that coordinate, the amplitude of each main control signal being proportional to the last-mentioned difference;

first and second means for combining the respective main control signals with command signals derived from the comparator means output associated with the other control signal to form first and second auxiliary control signals; and means for encoding the first and second auxiliary control signal in binary form.

19. A system as defined in claim 18, in which the encoding means is arranged so that the first and second auxiliary control signals each manifests a first binary state when the associated main control signal is larger than a common predetermined value, and manifests a second binary state when the associated main control signal is smaller than the predetermined value.

20. A system as defined in claim 18, in which the first and second combining means are arranged so that each main control signal is combined with the integral of the comparator means output associated with the other control signal.

21. A system as defined in claim 20, further comprising third means for generating a first sequence of pulses at a first predetermined rate; and first normally disabled means for individually applying the first sequence of pulses to the main branches of the comparator means during the occurrences of the first and second auxiliary control signals.

22. A system as defined in claim 21 for use with two mutually orthogonal coordinates, further comprising deciding means for enabling the first applying means associated with a selected one of the orthogonal coordinates.

23. A system as defined in claim 22 further comprising means for respectively positioning the moving means associated with the non-selected one of the coordinates at a relatively low constant velocity, the last-mentioned means comprising, in combination, an auxiliary pair of branches on the signal input of each comparator means, the auxiliary inputs being individually associated with the main branches; fourth means for generating a second sequence of pulses at a rate lower than the first predetermined rate; and second normally disabled means enabled by the deciding means in synchronism with the enabling of the first applying means of the selected coordinate for applying the second sequence of pulses to a selectable one of the auxiliary branches associated with the non-selected coordinate.

24. A system as defined in claim 23, in which the second predetermined rate is adjustable.

25. A system as defined in claim 23, further comprising means responsive to the second generating means of the non-selected coordinate for selecting the auxiliary branch to which the second sequence of pulses are to be applied when the associated second applying means are enabled.

26. A system as defined in claim 25, in which the deciding means compirses:

first and second binary accummulators individually driven by the second generating means associated with the respective coordinates;

a bistable circuit responsive to the outputs of the respective accummulators for generating a pair of pulses of opposite senses, the senses of the pulses being normally switched upon an occurrence of an output pulse from one of the accummulators, the pulses being individually available on a pair of separate outputs; and means for cross-coupling one of the outputs of the bistable circuit to the first applying means associated with one coordinate and to the second applying means associated with the other coordinate, and for cross-coupling the other output of the bistable circuit to the second applying means associated with the one coordinate and to the first applying means associated with the other coordinate.

27. A system as defined in claim 26, further comprising means responsive to successive output pulses of each accummulator for resetting both of the accummulators.

References Cited

UNITED STATES PATENTS

| | | | |
|---|---|---|---|
| 2,421,192 | 5/1947 | Engstron | 313—96 |
| 2,988,643 | 6/1961 | Inaba | 250—202 |
| 3,135,904 | 6/1964 | Purkhiser | 250—202X |
| 3,207,904 | 9/1965 | Heinz | 250—202 |
| 3,385,245 | 5/1968 | Ramsey et al. | 250—202 X |

ROBERT SEGAL, Primary Examiner

E. R. LA ROCHE, Assistant Examiner

U.S. Cl. X.R.

250—219